UNITED STATES PATENT OFFICE.

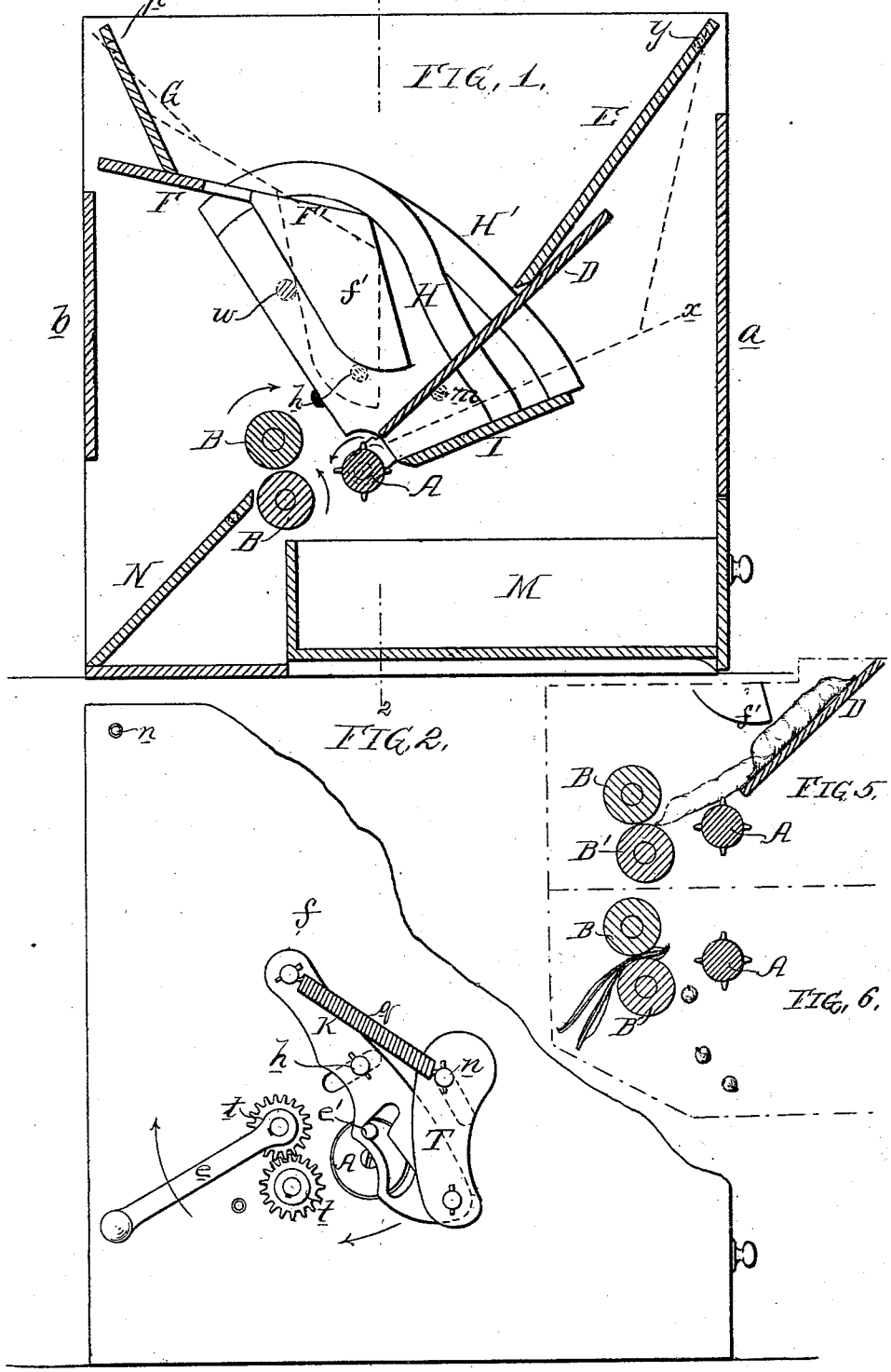

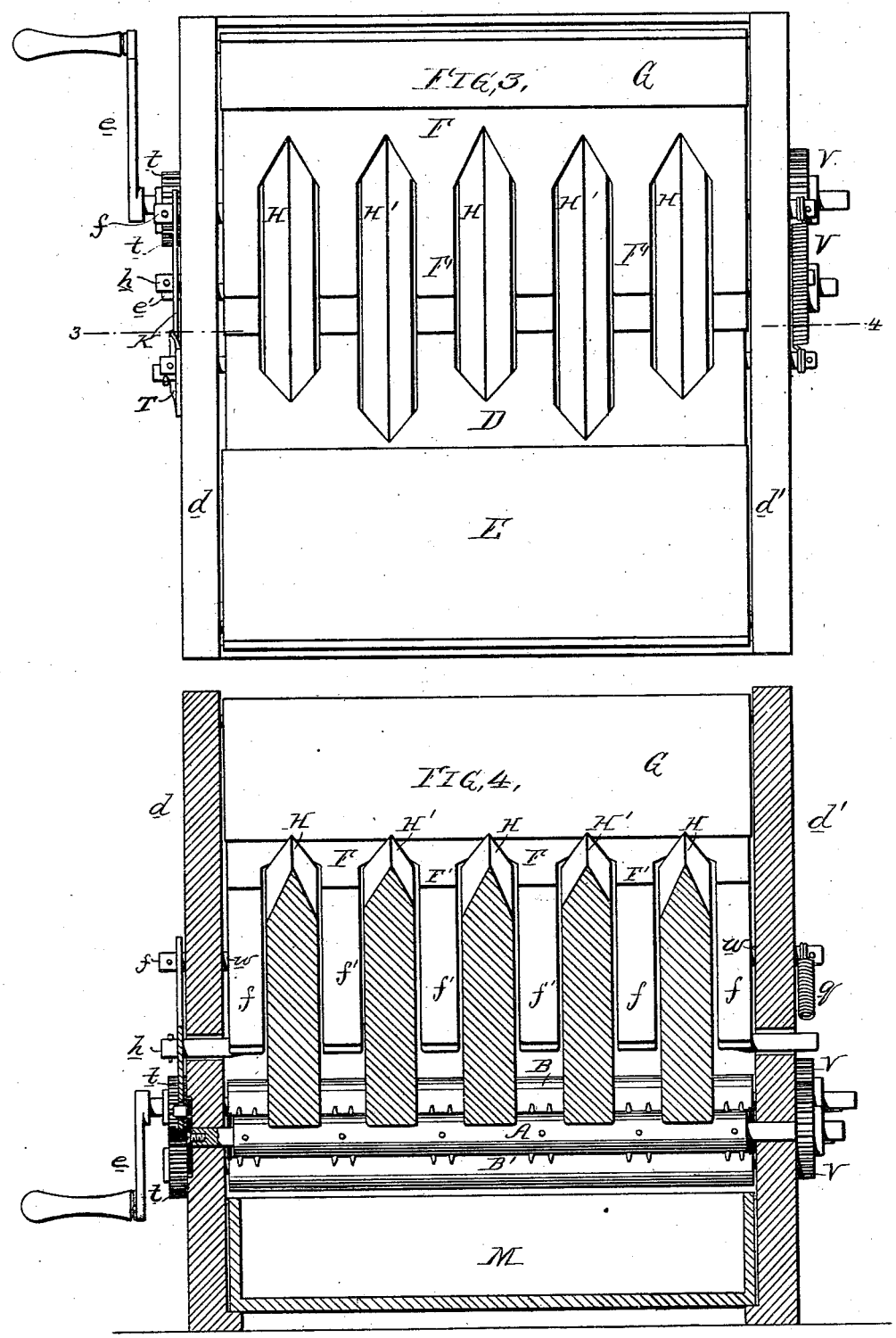

JOHN BUDD, OF PHILADELPHIA, PENNSYLVANIA.

IMPROVEMENT IN PEA-SHELLING MACHINES.

Specification forming part of Letters Patent No. 213,168, dated March 11, 1879; application filed September 30, 1878.

*To all whom it may concern:*

Be it known that I, JOHN BUDD, of Philadelphia, Pennsylvania, have invented a new and useful Improvement in Pea-Shelling Machines, of which the following is a specification:

The main object of my invention is to make a pea-shelling machine in which the pods contained in a hopper are so agitated and so controlled by ribs that in descending toward the shelling-rollers they will be presented to the latter endwise, as explained hereinafter.

In the accompanying drawings, Figure 1, Sheet 1, is a vertical section of my improved pea-shelling machine; Fig. 2, Sheet 1, a side elevation of part of the machine; Fig. 3, Sheet 2, a plan view; Fig. 4, Sheet 2, a vertical section on the line 1 2, Fig. 1, and the line 3 4, Fig. 3; and Figs. 5 and 6, views illustrating the shelling operation.

The frame of the machine consists of a box, of which $a$ is the front, $b$ the rear, and $d\ d'$ the opposite sides. A toothed roller, A, has its bearings in the opposite sides $d\ d'$ of the box, as also have the two rolls B B', the three rollers being so geared together that by turning the handle $e$ on one of the projecting journals of the roller B in the direction of its arrow the several rollers will turn in the directions pointed out by their arrows in Fig. 1.

To the shaft of the roller A is hinged a plate, D, to which a vibrating motion is imparted to the extent indicated by the dotted line $x$, the latter indicating the limit of its motion in one direction, and the plain lines the limit in the other direction. The plate D extends across the interior of the box from the side $d$ to the side $d'$ of the same, and its lower portion is slotted for admitting certain ribs referred to hereinafter.

An apron, E, also extending across the box, is pivoted at $y$ to the ends $d\ d'$, its lower edge resting on the top of the vibrating plate D; hence the latter must impart to the apron the vibrating motion indicated by plain and dotted lines.

A rocking frame, consisting of the plate F, a portion, F', of which is slotted, so as to form fingers, having projections $f'$, extends across the interior of the box, to the opposite sides of which it is pivoted at the point $w$, and an apron, G, pivoted at $p$ to the opposite sides of the box, bears with its lower edge on the plate F of the rocking frame. The extent of vibration of the said plate F of the rocking frame is indicated by the plain and dotted lines in Fig. 1.

The vibrating plate D and its apron E, and the rocking frame F and its apron G, constitute, with the opposite sides of the box, the hopper for receiving the pease to be shelled, the converging sides formed by the plates and aprons being in constant motion when the machine is in operation. The object of this is to keep the pods with which the hopper is filled, and from which the pease have to be extracted, in constant agitation.

It may be remarked here that the precise arrangement of parts constituting the movable portions of the hopper need not be adhered to exactly; the aprons E and G, for instance, might be dispensed with.

We will suppose the ribs H H', referred to above and fully described hereinafter, to be absent for the time being, and the pods to be descending toward the rollers.

The toothed roller A will seize whatever pods are within its reach and direct them to the rollers B B', which are clothed with rubber, and which seize the pods, the pease of which are squeezed from the shell and fall into the drawer M, while the shells are discharged from the rollers onto the inclined board N, down which they descend and fall into any suitable receptacle.

The pods, however, in descending the hopper would, in the absence of the ribs H H', be generally presented lengthwise to the shelling-rollers, and the pease would consequently, in most cases, be crushed with the shells. This is prevented by the said ribs, which, in the present instance, are secured to a stationary plate, I, extending across and secured to the opposite sides of the box.

The upper edges of these ribs are V-shaped or rounded, and the ribs H', which alternate with the bars H, are preferably different in the shape (longitudinally) of the upper edges from the said ribs H.

It will be seen that these ribs project up ward from below into the hopper, and that the vibrating plate D and frame F are slotted to receive them, so that a series of fingers in constant motion, and forming part of the rocking frame and plate D, project between the ribs.

The distance between the bars H H' is large enough for the free passage between them of the largest pods, so that the latter will seek the inclined plate D and be presented endwise to the toothed roller A, Fig. 5, which drags them to the shelling-rollers.

The pods in the hopper are agitated, tilted, and turned by the beveled edges of the ribs until they assume the desired positions before they reach the rollers, and this agitation serves to promote the descent of the pods.

The ribs H H' might be made to vibrate in a fixed hopper, or both the inclined sides of the hopper and the ribs might be vibrated; but I prefer the above-described plan.

As the rocking frame vibrates, the points of the projections $f'$ on the fingers of the frame, which are between the ribs, have such a movement that they will promote the descent of the pods and aid in properly presenting them to the rollers. The required vibrations are imparted to the rocking frame and plate D in the present instance through the medium of the mechanism shown in Fig. 2.

A crank-pin, $e'$, on the shaft of the roller A vibrates a lever, K, hung to a fixed pin, $f$, on the box; and a pin, $h$, on this lever is connected to one of the end projections F' of the rocking frame, a curved slot being cut in one side of the box to accommodate the movements of the said pin $h$.

The lower end of the lever K is connected to an arm, T, on a pin, $n$, attached to the edge of the vibrating plate D, the pin passing through, and being guided by a slot in the side of the box, and a spring, $q$, connecting the pin $n$ to the pin $f$ on the lever K, the movement of which in the direction of the arrow insures the depression of the pin $n$ in its slot, and the downward movement of the plate D, the upward movement of the pin $n$ in its slot, following the movement of the lever in a direction contrary to that pointed out by the arrow, and this upward movement of the pin is aided by the spring $q$. Similar mechanism may be arranged at the side of the machine opposite that shown in Fig. 2.

I do not wish, however, to confine myself to this mechanism, through the medium of which vibration is imparted from the roller-shaft to the rocking frame and plate D, as other devices equally as efficient as those described will readily suggest themselves.

In the present instance the shaft of the roller B, which is the driving-shaft, is geared to that of the roller B' by wheels $t\ t$ on one end of the box, while the same driving-shaft is geared to that of the toothed roller A by wheels V V at the opposite end of the machine.

Care should be taken to arrange the toothed roller A at such a distance from the roller B that the shelled pease can pass freely between them.

I claim as my invention—

1. The combination, in a pea-shelling machine, of a toothed feed-roller and a pair of shelling-rollers, B B' with the feed-hopper and with ribs H H', by the co-operation of which with the said hopper the pods are presented endwise to the rollers, all substantially as described.

2. The combination of ribs H H' with a hopper having slotted and vibrating sides, all as set forth.

3. The combination of the ribs H H' with the slotted vibrating plate D and pivoted apron E.

4. The combination of the ribs H H', the slotted rocking frame F, and apron G.

5. The combination of the projections $f'$ of the rocking frame with the vibrating plate D and ribs H H'.

In testimony whereof I have signed my name to this specification in the presence of two subscribing witnesses.

JOHN BUDD.

Witnesses:
  HARRY A. CRAWFORD,
  HARRY SMITH.